United States Patent
Suwa et al.

(10) Patent No.: US 7,247,343 B2
(45) Date of Patent: Jul. 24, 2007

(54) METHOD FOR MANUFACTURING MAGNETIC RECORDING MEDIUM

(75) Inventors: Takahiro Suwa, Chuo-ku (JP); Mitsuru Takai, Chuo-ku (JP); Kazuhiro Hattori, Chuo-ku (JP); Shuichi Okawa, Chuo-ku (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 10/924,991

(22) Filed: Aug. 25, 2004

(65) Prior Publication Data

US 2005/0048198 A1    Mar. 3, 2005

(30) Foreign Application Priority Data

Aug. 27, 2003  (JP) .............. 2003-303263

(51) Int. Cl.
  *B05D 5/12*    (2006.01)
(52) U.S. Cl. ............... 427/128; 427/130; 427/131; 427/132
(58) Field of Classification Search ............... 427/127, 427/128, 130, 131, 132
See application file for complete search history.

(56) References Cited

U.S. PATENT DOCUMENTS 4,994,162 A * 2/1991 Armstrong et al. .... 204/192.15
6,348,237 B2 * 2/2002 Kohler et al. ............... 427/489
6,673,226 B1 * 1/2004 Kogan et al. ................. 205/81

FOREIGN PATENT DOCUMENTS

| JP | A 6-89895 | 3/1994 |
| JP | A 7-18431 | 1/1995 |
| JP | A 7-58012 | 3/1995 |
| JP | A 9-97419 | 4/1997 |
| JP | A 10-247308 | 9/1998 |
| JP | A 10-330937 | 12/1998 |
| JP | A 2000-322710 | 11/2000 |
| JP | A 2003-272226 | 9/2003 |

* cited by examiner

*Primary Examiner*—Alain L. Bashore
(74) *Attorney, Agent, or Firm*—Oliff & Berridge, PLC

(57) ABSTRACT

A method for manufacturing a magnetic recording medium for efficiently and certainly manufacturing a magnetic recording medium. The magnetic recording medium has a recording layer formed to have predetermined concavo-convex pattern and an adequately flat surface. According to this method, a non-magnetic material is deposited on and filled into a member to be processed 10 by adjusting sputtering conditions in such a manner as to satisfy the following Eq I:

$$0.1 \leq V/V_0 - 0.003 \times (L \cdot d/t) + 1.2 \quad \text{Eq I}$$

where V represents a deposition rate which is the film thickness per unit of time, $V_0$ represent a deposition rate in a case that the bias power is zero, t represents the film thickness of the deposited non-magnetic material, L represents the width of a recording element, and d represents the depth of a recessed portion between the recording elements.

2 Claims, 14 Drawing Sheets

METHOD FOR MANUFACTURING MAGNETIC RECORDING MEDIUM

BACKGROUND OF THE INVENTION

1. Field of the Invention

The present invention relates to a method for manufacturing a magnetic recording medium in which a recording layer is formed into predetermined concavo-convex pattern over a substrate, and recessed portions of the concavo-convex pattern are filled with a non-magnetic material.

2. Description of the Related Art

In a conventional magnetic recording medium such as a hard disc, the areal density thereof has been increased remarkably by various technical improvements such as, making magnetic particles composing a recording layer finer, change materials to more effective ones, sophisticating of a head processing, and further improvement of the areal density is expected in the future.

However, problems such as the limitations of sophisticating of a head processing, a side fringe and crosstalk caused by the extent of a magnetic field have become conspicuous, so that the improvement of the areal density by use of conventional improving methods is approaching its limits. Accordingly, a discrete type magnetic recording medium is proposed as a candidate for a magnetic recording medium which can realize further improvement of the areal density (refer to, for example, Japanese Patent Laid-Open Publication No. Hei 9-97419). In this magnetic recording medium, a recording layer is formed into predetermined concavo-convex pattern and recessed portions of the concavo-convex pattern are filled with a non-magnetic material.

As the processing technique of forming the recording layer into the predetermined concavo-convex pattern, a method of dry etching such as reactive ion etching is available (refer to, for example, Japanese Patent Laid-Open Publication No. Hei 12-322710).

Processing techniques such as sputtering, which are used in a field of manufacturing a semiconductor, are available as methods for filling the non-magnetic material. When the processing techniques such as the sputtering are used, the surface of the non-magnetic material is formed into a concavo-convex shape by copying the concavo-convex pattern of the recording layer. The non-magnetic material is deposited on the top face of the recording layer, in addition to the recessed portions of the concavo-convex pattern.

To obtain the stable flying of the head, it is preferable to flatten the surfaces of the recording layer and the non-magnetic material. It is also preferable that any surplus non-magnetic material on the recording layer should be removed as much as possible in order to obtain a fine magnetic property. Processing techniques such as CMP (chemical mechanical polishing), which are used in the field of manufacturing a semiconductor, are available for removing the surplus non-magnetic material on the recording layer to flatten the surfaces of the recording layer and the non-magnetic material.

When the film thickness of the non-magnetic material is thin, however, the non-magnetic material is not completely filled into the recessed portion of the concavo-convex pattern, so that there are cases that the surfaces of the recording layer and the non-magnetic material cannot be adequately flattened.

Even if the non-magnetic material is completely filled into the recessed portions between the recording layers, when the film thickness of the non-magnetic material is thin, the surfaces of the recording layer and the non-magnetic material may not be adequately flattened. To be more specific, as shown in FIG. 21A, the surface of a non-magnetic material 102 is formed into a slightly concavo-convex shape by copying an concavo-convex shape of a recording layer 104. The non-magnetic material 102 is flattened with overall removal in an flattening process, and concavo-convex shape in the surface is gradually eliminated. If the film thickness of the non-magnetic material is thin, the flattening process having the effect of eliminating the concavo-convex shape in the surface becomes substantially short. Therefore, as shown in FIG. 21B, even if the non-magnetic material 102 is removed up to the top faces of the recording elements 104, the concavo-convex shape in the surface of the non-magnetic material 102 may not be adequately eliminated.

By contrast, depositing the non-magnetic material thicker can solve the foregoing problem, but brings another problem that efficiency in the use of material decreases and manufacturing cost increases. Also, there is a problem that time for the flattening process becomes long, and hence manufacturing efficiency decreases. Furthermore, the film thickness of the deposited non-magnetic material tends to vary in a constant proportion in accordance with areas on the substrate. Thus, when the non-magnetic material is thickly deposited, the distribution of film thickness (variations in film thickness) of the non-magnetic material becomes extensive. This may reduce the effect on flattening the surface by depositing the non-magnetic material thicker. Otherwise, the surface cannot be adequately flattened in the flattening process, and the degree of the concavo-convex shape in the surface of the magnetic recording medium may contrarily become larger.

SUMMARY OF THE INVENTION

In view of the foregoing problems, various exemplary embodiments of this invention provide a method for manufacturing a magnetic recording medium, by which the magnetic recording medium having a recording layer formed into predetermined concavo-convex pattern and an adequately flat surface can be efficiently and certainly manufactured.

To achieve the above object, according to one exemplary embodiment of this invention, a method for depositing a non-magnetic material on the surface of a member to be processed while a bias power is applied to the member to be processed is used in a non-magnetic material filling process. In this process, concavo-convex shape in the surface of the non-magnetic material is restrained by controlling the ratio $V/V_0$ of deposition rates to a range represented by the following Eq I:

$$0.1 \leq V/V_0 \leq -0.003 \times (L \cdot d/t) + 1.2 \qquad \text{Eq I}$$

The inventors confirmed by experiment and the like that stable flying of a head was certainly obtained when the surface roughnesses Ra (arithmetic mean deviation of the surface) of recording elements and the non-magnetic material were 1.7 or less.

When the non-magnetic material is deposited on the surface of the member to be processed by use of a deposition technique such as sputtering and the like, however, particles of the non-magnetic material tend to be equally deposited while copying the concavo-convex shape of the recording layer. Since the degree of the concavo-convex shape in the surface of the deposited non-magnetic material tends to be large, it is difficult to reduce the surface roughnesses Ra of the recording elements and the non-magnetic material to 1.7 or less, even if a flattening process is carried out.

Thus, the inventors attempted to form a film of the non-magnetic material on the surface of the member to be processed by use of a deposition technique such as a bias sputtering method, in which the non-magnetic material is deposited on the surface of the member to be processed with applying bias power to the member to be processed. In the deposition technique with applying the bias power, a deposition function for depositing a non-magnetic material and an etching function for etching the formed non-magnetic material film by a gas biased by the bias power are simultaneously carried out. When the deposition function exceeds the etching function, the formation of the film progresses. The etching function tends to selectively remove projected portions of the deposited non-magnetic material earlier than the other portions. The inventors thought that the etching function could restrain concavo-convex shape in the surface of the non-magnetic material deposited in the non-magnetic material filling process.

Even if the deposition technique with applying the bias power is actually used for depositing a non-magnetic material, however, there are cases that the concavo-convex shape in the surface of the non-magnetic material cannot be adequately restrained, or the deposited non-magnetic material may exfoliate. Therefore it is still difficult to restrict the surface roughnesses Ra of the recording layer and the non-magnetic material to 1.7 or less, even if the flattening process is carried out.

Accordingly, the inventors further diligently considered and tried various conditions for the deposition techniques with applying the bias power. Then, the inventors found out that it was possible to adequately reduce the degree of the concavo-convex shape in the surface of the non-magnetic material in the non-magnetic material filling process in such a level that the surface roughnesses of the recording layer and the non-magnetic material after the flattening process were controlled to 1.7 or less. This was achieved by means of adjusting the deposition conditions in such a manner as to control the ratio $V/V_0$, that is the ratio of the deposition rate V to the deposition rate $V_0$ ($V_0$ is in the case where the bias power is zero) within a range indicated by the foregoing Eq I.

The reason why the concavo-convex shape in the surface of the non-magnetic material deposited during the non-magnetic material filling process is restrained adequately small by means of adjusting the sputtering conditions in such a manner as to restrict the ratio $V/V_0$ within a range indicated by the foregoing Eq I is not always apparent, but generally as follows.

The ratio $V/V_0$ of the deposition rates is a value representing the ratio between the deposition function and the etching function in the deposition technique with applying the bias power. The smaller this value, the higher the ratio of the etching function is. Hence it is possible to restrain the concavo-convex shape in the surface of the non-magnetic material deposited during the non-magnetic material filling process.

The surface roughness of the non-magnetic material deposited during the non-magnetic material filling process varies in accordance with the degree of concavo-convex shape in the surface of the member to be processed. The surface roughness increases as the width L in a projected portion and the depth d of a recessed portion of a concavo-convex pattern increase. On the other hand, the surface roughness of the deposited non-magnetic material decreases as the film thickness t of the non-magnetic material increase.

Accordingly, the deposition conditions should be adjusted in the direction of increasing the ratio of the etching function, that is, the direction of decreasing the ratio $V/V_0$, as the width L of the projected portion and the depth d of the recessed portion in the concavo-convex pattern increase and the film thickness t decreases. In other words, the deposition conditions should be adjusted in the direction of decreasing the ratio $V/V_0$, as the value L·d/t increases. By controlling the ratio $V/V_0$ to the upper limit value or less indicated on the right side of the foregoing Eq I, it is possible to adequately restrain concavo-convex shape in the surface of the non-magnetic material.

On the other hand the exfoliation of the non-magnetic material is caused by the etching function in the deposition technique with applying the bias power. Thus, to prevent the exfoliation of the non-magnetic material, the deposition conditions should be adjusted in the direction of restraining the etching function, that is, in the direction of increasing the ratio $V/V_0$. By controlling the ratio $V/V_0$ to the lower limit value or more indicated on the left side of the foregoing Eq I, it is possible to restrain the exfoliation of the non-magnetic material.

In the foregoing Eq I, units of each variable are V (Å/min), $V_0$ (Å/min), L (nm), d (nm), and t (nm).

In this description, "a recording layer is formed into predetermined concavo-convex pattern over a substrate" means that a recording layer is formed into predetermined patterns over a substrate to be divided into many recording elements, thereby forming the recessed portion between the recording elements. In addition, this also means that the recording layer is partially divided, for example, spiral recording elements are formed over the substrate, or recording elements in a partially continuous predetermined pattern are formed over the substrate, thereby forming the recessed portion between the recording elements. Furthermore, this also means that both of a projected portion and a recessed portion are formed in the recording layer.

According to various exemplary embodiments of this invention, since concavo-convex shape in the surface of the non-magnetic material deposited during the non-magnetic material filling process is restrained, it is possible to flatten the surfaces of the recording layer and the non-magnetic material in the flattening process even if the non-magnetic material is thinly deposited. Since it is possible to thinly form the non-magnetic material, a period of time for the flattening process is made short. Hence it is possible to improve manufacturing efficiency. Therefore, even if the recording layer is formed into the concavo-convex pattern, it is possible to efficiently and certainly manufacture the magnetic recording medium the surface of which is adequately flat.

BRIEF DESCRIPTION OF THE DRAWINGS

Various exemplary embodiments of the present invention will be described in detail with reference to the accompanying drawings, wherein.

DETAILED DESCRIPTION OF PREFERRED EMBODIMENTS

Various exemplary embodiments of this invention will be hereinafter described in detail with reference to the drawings.

Figure 1:
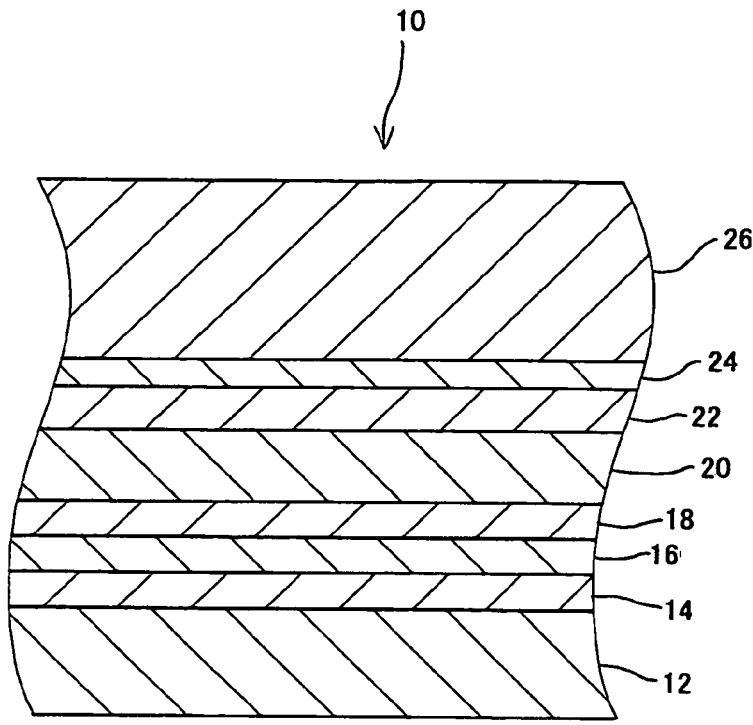
FIG. 1 is a sectional view schematically showing the configuration of a processing start member of a member to be processed according to an exemplary embodiment of this invention.
Figure 2:
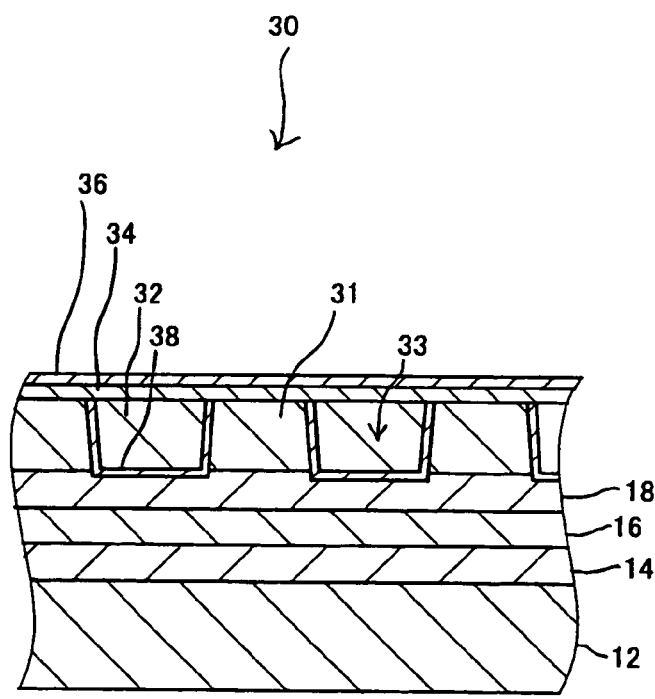
FIG. 2 is a sectional view schematically showing the configuration of a magnetic recording medium which is obtained by processing the member to be processed.

In this exemplary embodiment, a processing start member of a member to be processed as shown in FIG. 1 has a continuous recording layer and the like formed over the surface of a substrate. The processing start member is subjected to processing, so that the continuous recording layer is divided into many recording elements in a predetermined concavo-convex pattern. Recessed portions between the recording elements (recessed portions of the concavo-convex pattern) are filled with a non-magnetic material. This exemplary embodiment relates to a method for manufacturing a magnetic recording medium, by which a magnetic recording medium as shown in FIG. 2 is manufactured, and has characteristics in a non-magnetic material filling process. Since the other processes do not necessarily seem so important to understand this exemplary embodiment, description thereof will be appropriately omitted.

Referring to FIG. 1, the processing start member of the member to be processed includes an underlayer, a soft magnetic layer 16, a seed layer 18, a continuous recording layer 20, a first mask layer 22, a second mask layer 24, and a resist layer 26 formed in this order over a glass substrate 12.

The underlayer 14 having a thickness of 30 to 200 nm is made of Cr (chromium) or a Cr alloy.

The soft magnetic layer 16 having a thickness of 50 to 300 nm is made of a Fe (iron) alloy or a Co (cobalt) alloy.

The seed layer 18 having a thickness of 3 to 30 nm is made of CoO, MgO, NiO, or the like.

The continuous recording layer 20 having a thickness of 5 to 30 nm is made of a CoCr (cobalt-chromium) alloy.

The first mask layer 22 having a thickness of 3 to 50 nm is made of TiN (titanium nitride).

The second mask layer 24 having a thickness of 3 to 30 nm is made of Ni (nickel).

The resist layer 26 having a thickness of 30 to 300 nm is made of a negative resist (NBE22A of Sumitomo Chemical Co., Ltd).

As shown in FIG. 2, a magnetic recording medium 30 is magnetic recording disc of a discrete track type on a perpendicular recording system. The continuous recording layer 20 is divided into many recording elements 31 at minute intervals in a radial direction of the track. Recessed portions 33 between the recording elements 31 are filled with a non-magnetic material 32. A protective layer 34 and a lubricating layer 36 are formed in this order over the recording elements 31 and the non-magnetic material 32. In a servo area of the magnetic recording medium 30, the continuous recording layer 20 is divided into the many recording elements having a predetermined servo pattern (illustration is omitted). A barrier layer 38 is formed between the recording element 31 and the non-magnetic material 32.

The non-magnetic material 32 is made of $SiO_2$ (silicon dioxide). Both of the protective layer 34 and the barrier layer 38 are made of a hard carbon film called diamond-like carbon, and the lubricating film 36 is made of PFPE (perfluoro polyether). In this description, the term "diamond-like carbon (hereinafter referred to as "DLC")" designates a material which comprises carbon as a main component with an amorphous structure and has a hardness of approximately 200 to 8000 $kgf/mm^2$ in Vickers hardness measurement.

Figure 3:
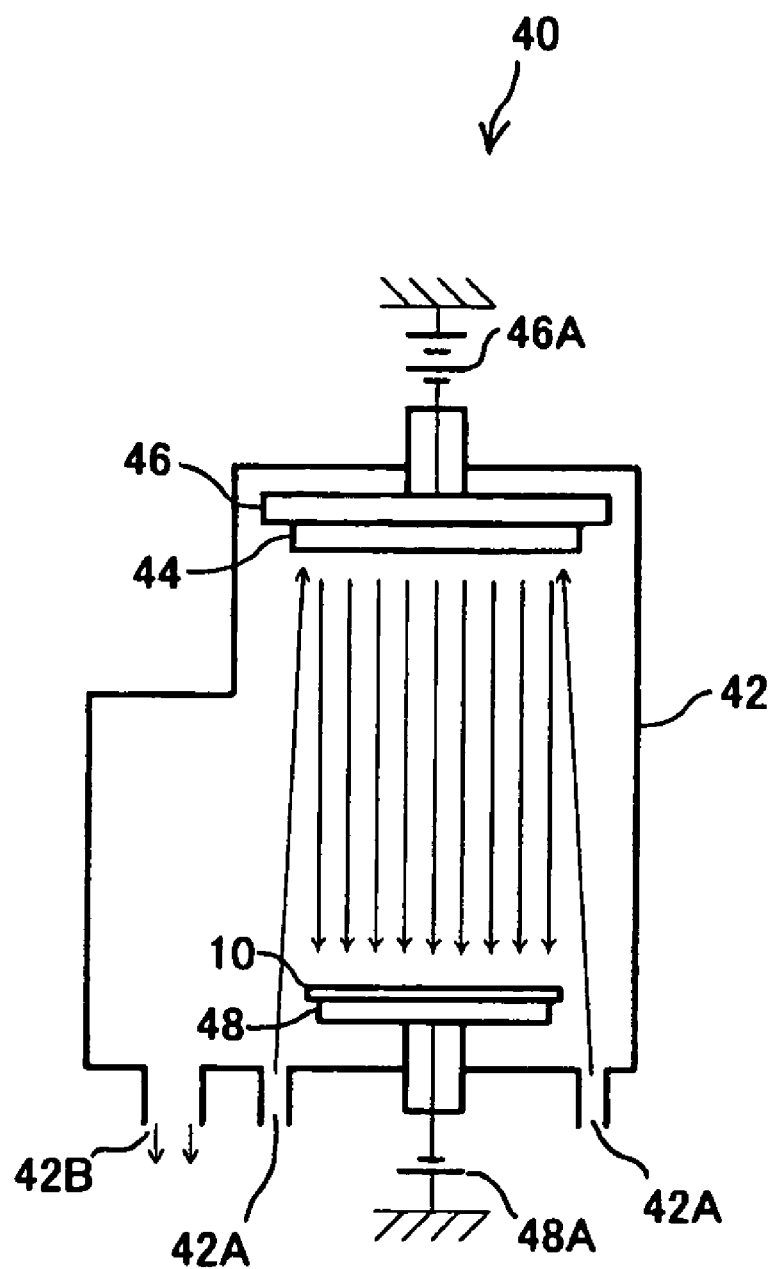
FIG. 3 is a sectional view schematically showing the configuration of a bias sputtering device for filling the member to be processed with a non-magnetic material.

The non-magnetic material 32 is filled with the use of a bias sputtering device as shown in FIG. 3.

A bias sputtering device 40 includes a vacuum chamber 42, a target holder 46 for holding a target 44 of SiO$_2$ (non-magnetic material) in the vacuum chamber 42, and a holder 48 for holding the member to be processed 10 in the vacuum chamber 42.

The vacuum chamber 42 is provided with an inlet 42A for supplying a sputtering gas such as an Ar (argon) gas, and an outlet 42B for discharging the sputtering gas.

The target holder 46 is connected to a power supply 46A, and the holder 48 is connected to a power supply 48A.

In the bias sputtering device 40, sputtering conditions (deposition conditions) such as a bias voltage (a voltage of the power supply 48A), a pressure in the vacuum chamber 42, a distance between the target 44 and the member to be processed 10 are adjustable. Adjusting the sputtering conditions makes it possible to adjust a deposition rate V.

Figure 4:
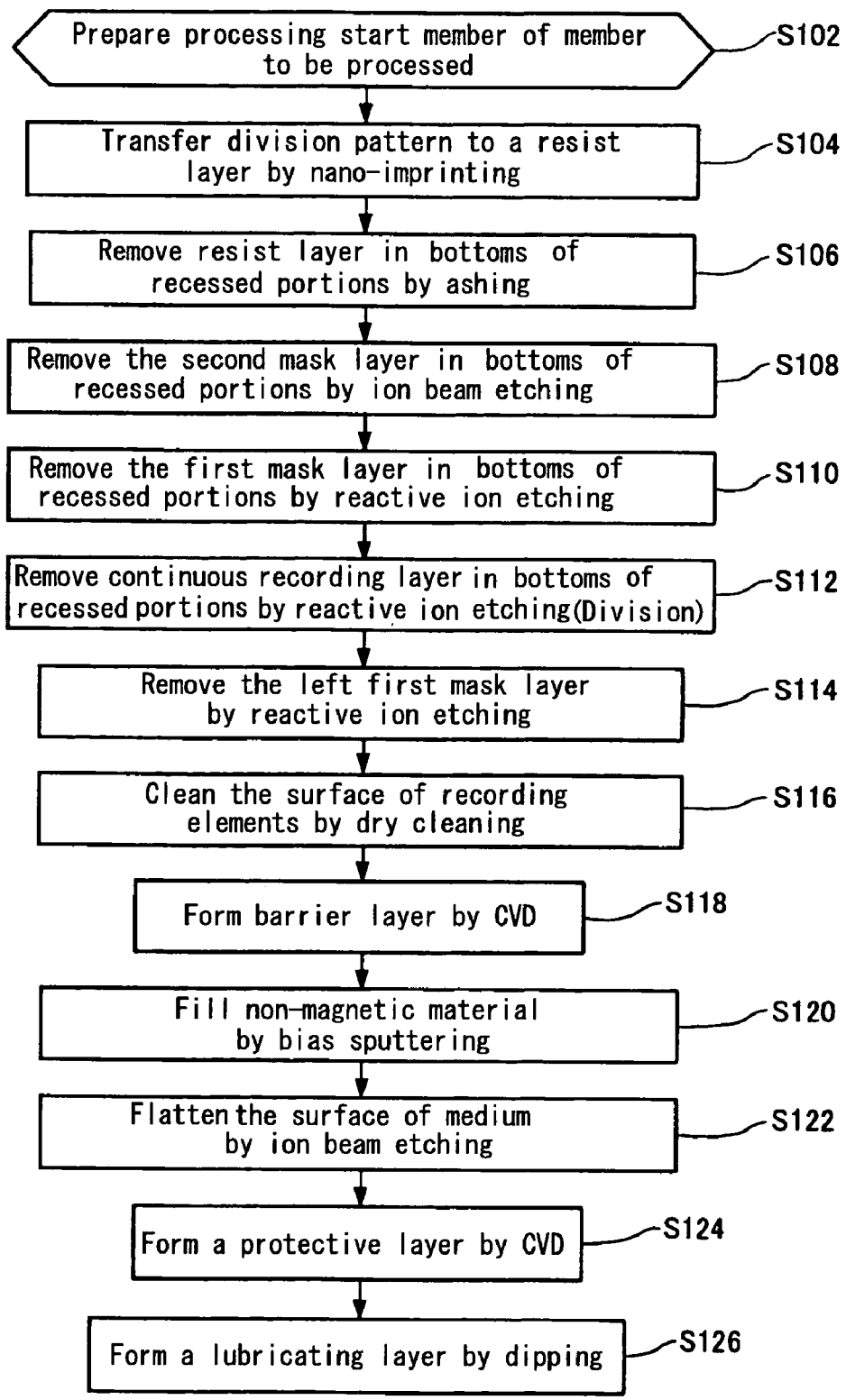
FIG. 4 is a flowchart showing an overview of a manufacturing process of the magnetic recording medium.

Then, a method for processing the member to be processed 10 will be described along a flowchart shown in FIG. 4.

First, the processing start member of the member to be processed 10 shown in FIG. 1 is prepared (S102). The processing start member of the member to be processed 10 can be obtained by forming the underlayer 14, the soft magnetic layer 16, the seed layer 18, the continuous recording layer 20, the first mask layer 22, and the second mask layer 24 in this order over the glass substrate 12 by a sputtering method, and then applying the resist layer 26 by a dipping method. The resist layer 26 may be applied by a spin coating method.

Figure 5:
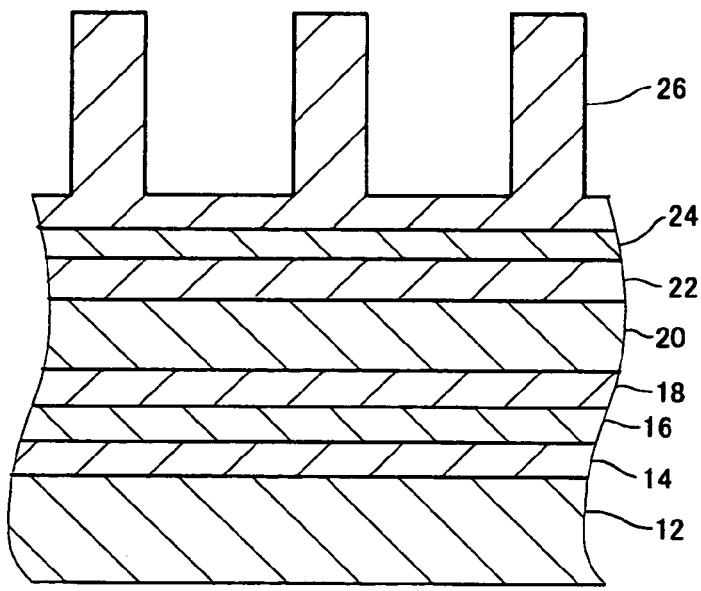
FIG. 5 is a sectional view schematically showing the shape of the member to be processed in which concavo-convex pattern are transferred to a resist layer.

A predetermined servo pattern (not illustrated) including a contact hole, and a concavo-convex pattern as shown in FIG. 5 corresponding to the concavo-convex pattern of the recording elements 31 at minute intervals are transferred to the resist layer 26 of the processing start member of the member to be processed 10 by a nano-imprinting method by use of a transfer device (not illustrated) (S104). Many recessed portions corresponding to a division pattern may be formed by exposing and developing the resist layer 26.

Figure 6:
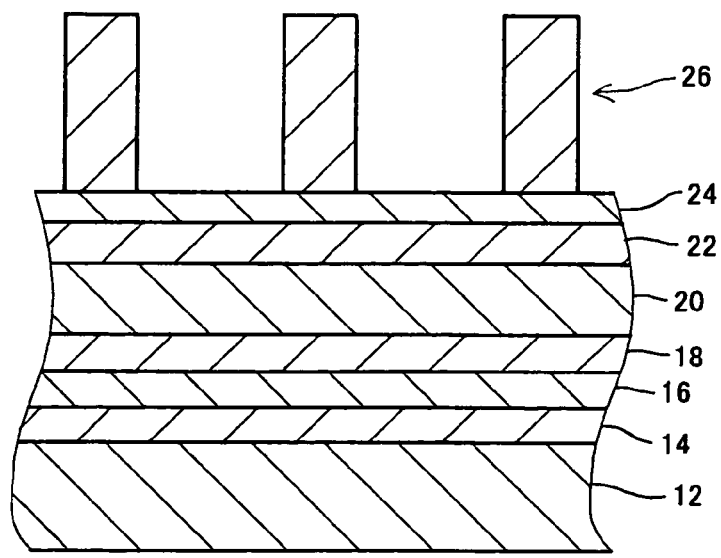
FIG. 6 is a sectional view schematically showing the shape of the member to be processed in which the resist layer in the bottoms of the recessed portions is removed.

Then, as shown in FIG. 6, the resist layer 26 in the bottoms of the recessed portions of the concavo-convex pattern is removed by ashing (S106). At this time, a part of the resist layer 26 in areas except for the recessed portions is removed, but the resist layer 26 in areas except for the recessed portions is left by a difference in height with the bottom faces of the recessed portion.

Figure 7:
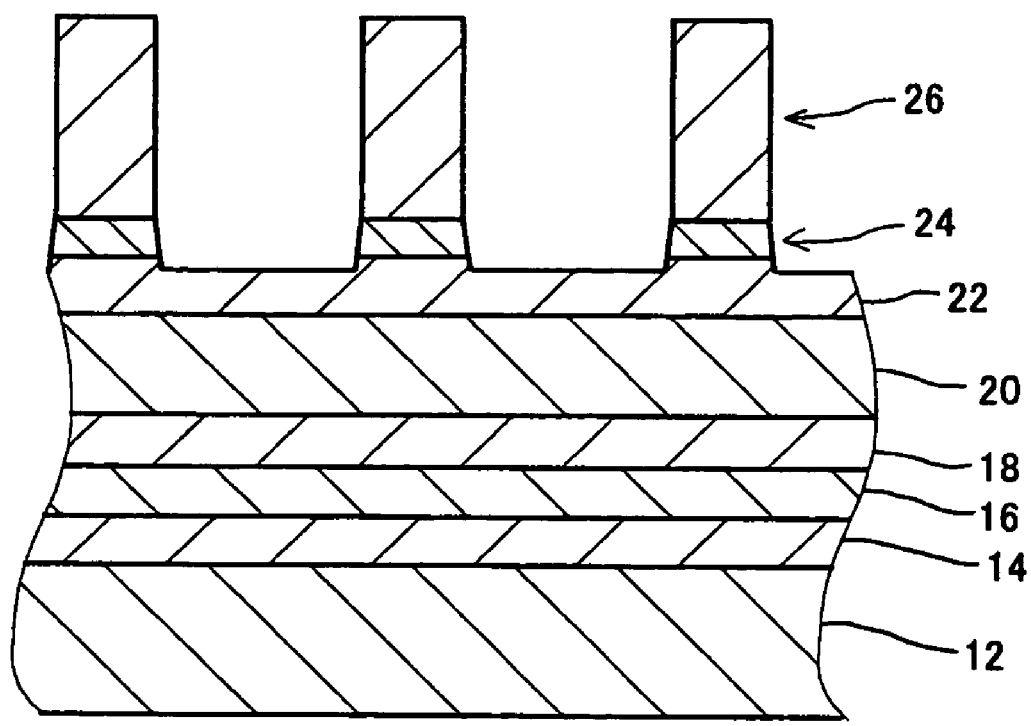
FIG. 7 is a sectional view schematically showing the shape of the member to be processed in which a second mask layer in the bottoms of the recessed portions is removed.

Then, as shown in FIG. 7, the second mask layer 24 in the bottoms of the recessed portions is removed by ion beam etching using an Ar (argon) gas (S108).

At this time, a part of the resist layer 26 in the areas except for the recessed portion is removed.

Figure 8:
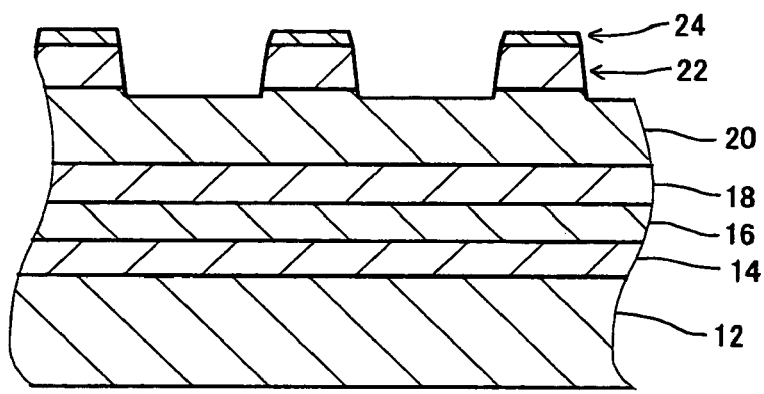
FIG. 8 is a sectional view schematically showing the shape of the member to be processed in which a first mask layer in the bottoms of the recessed portions is removed.

Then, as shown in FIG. 8, the first mask layer 22 in the bottoms of the recessed portions is removed by reactive ion etching using a SF$_6$ (sulfur hexafluoride) gas (S110). Thus, the continuous recording layer 20 is exposed in the bottoms of the recessed portions. At this time, the resist layer 26 in the areas except for the recessed portions is completely removed. A part of the second mask layer 24 in the areas except for the recessed portions is removed, but a small amount thereof is left.

Figure 9:
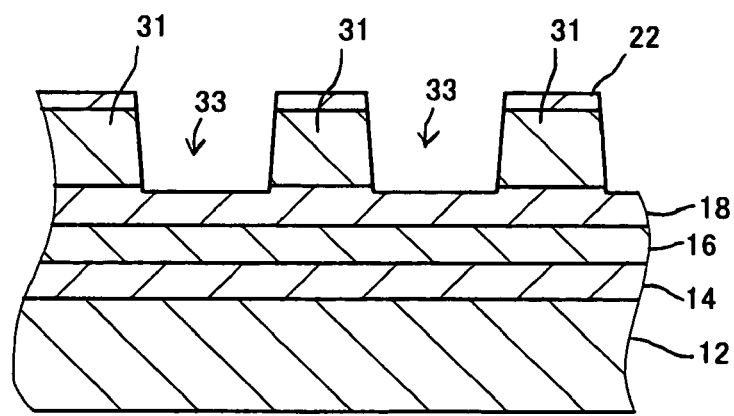
FIG. 9 is a sectional view schematically showing the shape of the member to be processed in which recording elements are formed.

Then, as shown in FIG. 9, the continuous recording layer 20 in the bottoms of the recessed portions is removed by reactive ion etching using a CO gas and an NH$_3$ gas as a reactive gas (S112). Thus, the continuous recording layer 20 is divided into the many recording elements 31.

The second mask layer 24 in the areas except for the recessed portions is completely removed by this reactive ion etching. The first mask layer 22 in the areas except for the recessed portions is partly removed, but a small amount of the first mask layer 22 is left on the top faces of the recording elements 31.

Figure 10:
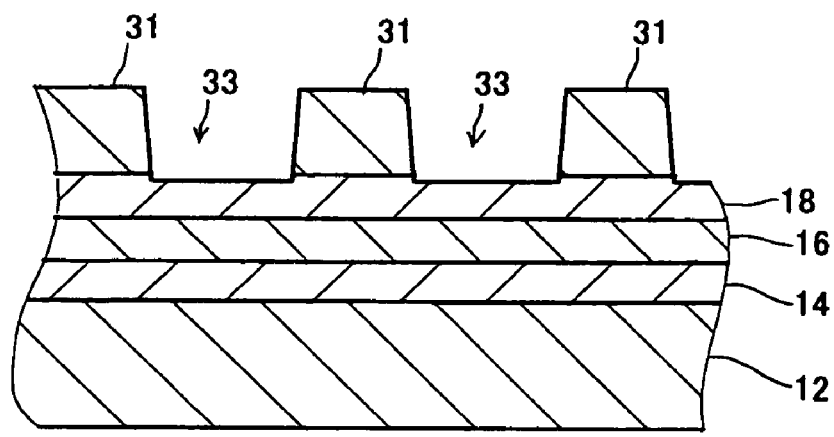
FIG. 10 is a sectional view schematically showing the shape of the member to be processed in which the first mask layer left on the top faces of the recording elements are removed.

Then, as shown in FIG. 10, the first mask layer 22 remaining on the top faces of the recording elements 31 is completely removed by reactive ion etching using a SF$_6$ gas as a reactive gas (S114).

Then, the surface of the member to be processed 10 is cleaned (S116). To be more specific, a reduction gas such as an NH$_3$ gas is supplied to remove the SF$_6$ gas and the like left on the surface of the member to be processed 10.

Figure 11:
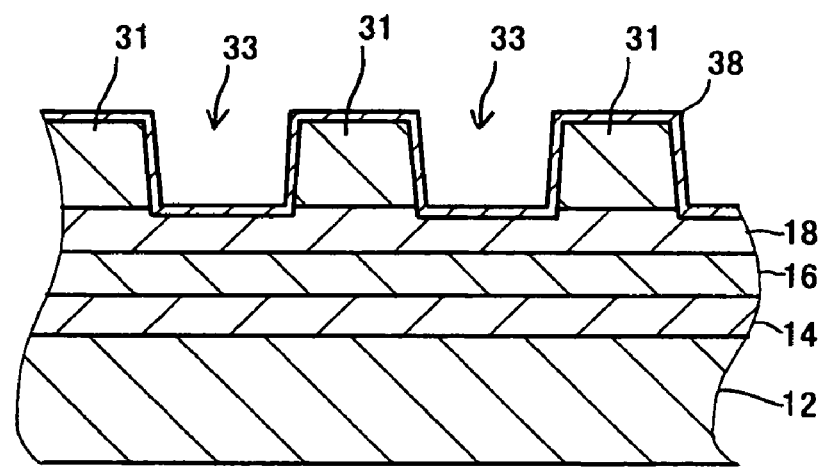
FIG. 11 is a sectional view schematically showing the shape of the member to be processed in which a barrier layer is formed on the top faces of the recording elements and the recessed portions between the recording elements.

Then, as shown in FIG. 11, the barrier layer 38 made of DLC is formed on the recording elements 31 in a thickness of 1 to 20 nm by a CVD method (S118).

Then, the non-magnetic material 32 is deposited by use of the bias sputtering device 40 so as to fill the recessed portions 33 between the recording elements 31 with particles of SiO$_2$ (S120). The non-magnetic material 32 is deposited so as to completely cover the barrier layer 38. The recording elements 31 are not degraded by the bias sputtering of the non-magnetic material 32 because the recording elements 31 are covered and protected by the barrier layer 38.

At this time, the sputtering conditions (deposition conditions) of the bias sputtering device 40 are adjusted so as to satisfy the following Eq I:

$$0.1 \leq V/V_0 \leq -0.003 \times (L \cdot d/t) + 1.2 \qquad \text{Eq I}$$

wherein, V (Å/min) represents a deposition rate, $V_0$ (Å/min) represents the deposition rate in a case that bias power is zero, t (nm) represents the film thickness of the deposited non-magnetic material 32, L (nm) represents the width of the recording element 31 (width of a projected portion of the concavo-convex pattern), and d (nm) represents the depth of the recessed portion 33 between the recording elements 31. To be more specific, the sputtering conditions such as the bias voltage, the pressure in the vacuum chamber 42, the distance between the target 44 and the member to be processed 10 and the like are adjusted. A value of the ratio $V/V_0$ tends to decrease as the bias voltage and the pressure in the vacuum chamber 42 increase. The value of the ratio $V/V_0$ tends to slightly increase as the distance between the target 44 and the processed member 10 decreases.

Figure 12A:
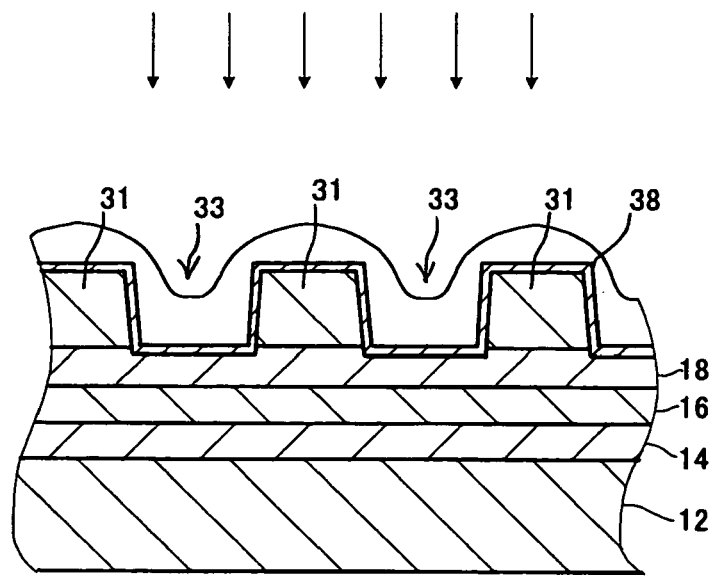
FIG. 12A is a sectional view schematically showing a deposition function in non-magnetic material filling process in which the non-magnetic material is filled into the recessed portions between the recording elements.

In a state that the sputtering conditions are adjusted like this, the member to be processed 10 is held by the holder 48. Supplying the sputtering gas into the vacuum chamber 42 through the inlet 42A, the sputtering gas collides with the target 44 and the scattered particles of SiO$_2$ are deposited on the surface of the processed member 10. The particles of the SiO$_2$ are equally deposited while copying the concavo-convex shape of the recording layer, so that the surface tends to be concavo-convex as shown in FIG. 12A.

On the other hand, since the power supply 48A applies the bias voltage to the holder 48, the sputtering gas biased in the direction of the processed member 10 by the bias voltage collides with the SiO$_2$ which has been deposited, to etch a part of the deposited SiO$_2$.

Figure 12B:
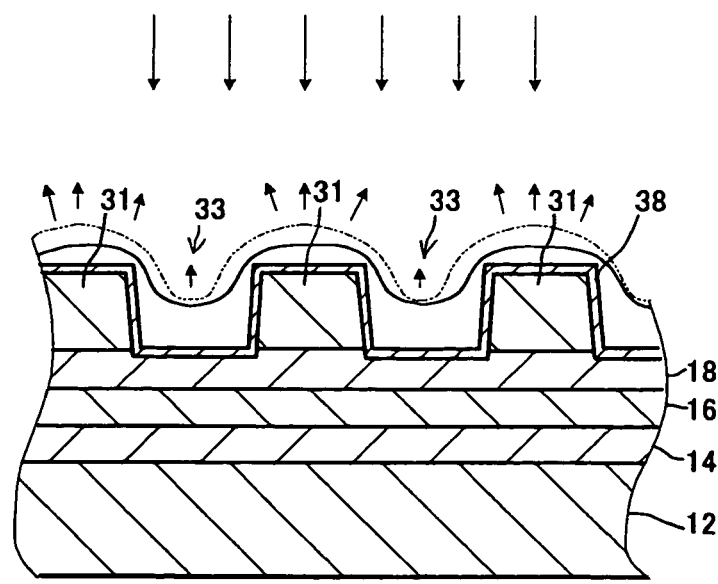
FIG. 12B is a sectional view schematically showing a etching function in non-magnetic material filling process in which the non-magnetic material is filled into the recessed portions between the recording elements.

This etching function tends to selectively remove the deposited SiO$_2$ in protruding portions earlier than that in the other portions. This makes the surface of the SiO$_2$ be gradually flattened as shown in FIG. 12B.

At this time, since the value of the ratio $V/V_0$ is limited to the value of $-0.003 \times (L \cdot d/t) + 1.2$ or less, it is possible to certainly obtain a constant etching function. Therefore, concavo-convex shape in the surface of the SiO$_2$ is restrained.

The value of the ratio $V/V_0$, on the other hand, is limited to 0.1 or more. This limits the etching function at a certain degree, so that it is possible to prevent the exfoliation of the deposited $SiO_2$.

Figure 13:
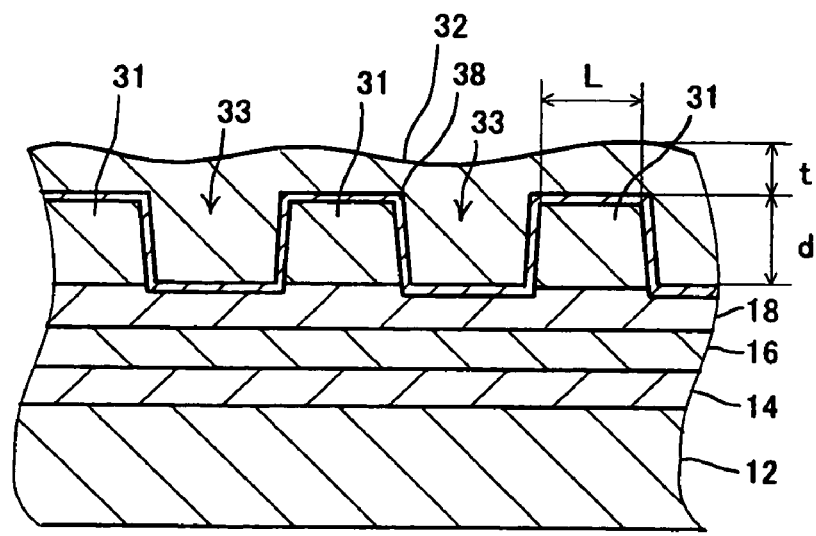
FIG. 13 is a sectional view schematically showing the shape of the member to be processed in which the non-magnetic material is deposited.
Figure 21A:
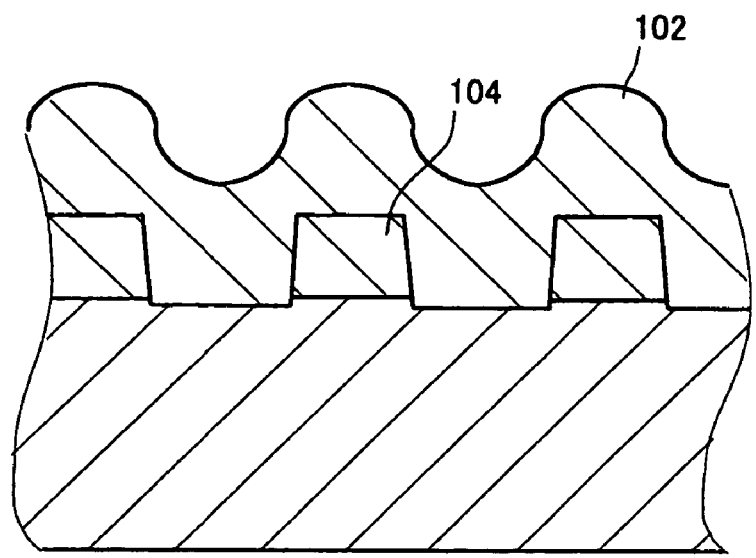
FIG. 21A is a sectional view schematically showing the shape of the deposited non-magnetic material in a conventional magnetic recording medium manufacturing process.
Figure 21B:
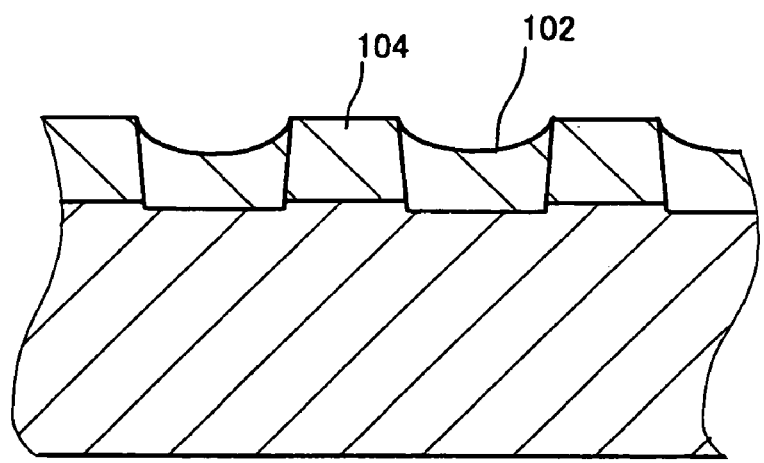
FIG. 21B is a sectional view schematically showing the shape of the surfaces of recording elements and the non-magnetic material after being flattened in a conventional magnetic recording medium manufacturing process.

Namely, as shown in FIG. 13, the non-magnetic material 32 is deposited in a flat shape in which concavo-convex shape in the surface thereof is restrained, as opposed to a shape by a conventional deposition technique as shown in the foregoing FIG. 21A. FIGS. 12A and 12B separately show the deposition function and the etching function by the bias sputtering, in order to understand these functions. Actually, however, these functions are simultaneously carried out, and the deposition proceeds with restraining the surface from being concavo-convex because the deposition function exceeds the etching function.

Figure 14:
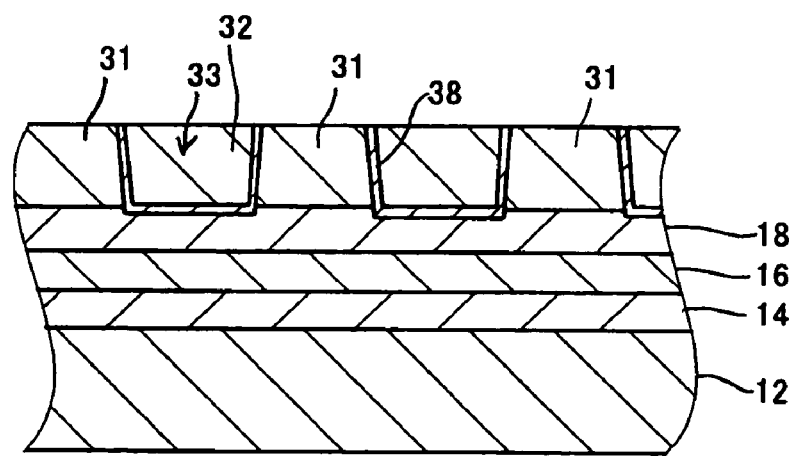
FIG. 14 is a sectional view schematically showing the shape of the member to be processed in which the surfaces of the recording elements and the non-magnetic material are flattened.

Then, as shown in FIG. 14, the non-magnetic material 32 is removed up to the top faces of the recording elements 31 by ion beam etching, to flatten the surfaces of the recording elements 31 and the non-magnetic material 32 (S122). The barrier layer 38 on the top face of the recording element 31 may be completely removed, or a part thereof may be left.

Since the non-magnetic material 32 is deposited to provide a surface shape of which the concavo-convex shape is restrained by a minute amount in a non-magnetic material filling process (S120), it is possible to certainly flatten the concavo-convex shape in the surface with overall removal of the non-magnetic material 32 in the whole area by the ion beam etching.

To precisely flatten the surfaces of the recording elements 31 and the non-magnetic material 32 at this time, it is preferable that an incident angle of Ar ions is limited to a range of −10 to 15 degrees with respect to the surface. When the surfaces of the recording elements 31 and the non-magnetic material 32 are adequately flattened in the non-magnetic material filling process, on the other hand, it is possible that the incident angle of Ar ions is set in a range of 30 to 90 degrees. In this case, the processing speed increases, and hence it is possible to increase the manufacturing efficiency. The term "incident angle" refers to an incident angle with respect to the surface of the member to be processed, and means an angle which the surface of the member to be processed forms with the central axis of an ion beam. Taking a case that the central axis of the ion beam is in parallel with the surface of the member to be processed, for example, the incident angle is 0 degree.

Then, the protective layer 34 made of DLC is formed on the top faces of the recording elements 31 and the non-magnetic material 32 in a thickness of 1 to 5 nm by a CVD (chemical vapor deposition) method (S124).

Furthermore, the lubricating layer 36 made of PFPE is formed over the protective layer 34 in a thickness of 1 to 2 nm by a dipping method (S126). Therefore, the magnetic recording medium 30 shown in FIG. 2 is completed.

Since the non-magnetic material 32 is deposited to provide a restrained surface shape of which the concavo-convex shape is restrained by a minute amount in the non-magnetic material filling process (S120), as described above, it is possible to certainly flatten the surfaces of the recording elements 31 and the non-magnetic material 32 in the flattening process (S122) even if the non-magnetic material 32 is thinly deposited in the non-magnetic material filling process (S120). Thinly depositing the non-magnetic material 32 makes it possible to increase efficiency in the use of the non-magnetic material 32 and also shorten a period of time for the flattening process. Thus, it is possible to increase manufacturing efficiency.

The non-magnetic material 32 is made of $SiO_2$ in this exemplary embodiment. Other non-magnetic material may be used as long as the material is suited for the bias sputtering.

In this exemplary embodiment, the non-magnetic material 32 is deposited by use of the bias sputtering method in the non-magnetic material filling process (S120) to fill the recessed portions 33 between the recording elements 31 with the non-magnetic material 32. A deposition technique is not specifically limited, as long as the non-magnetic material is deposited on the surface of the member to be processed with applying bias power to the member to be processed. The non-magnetic material 32 may be deposited and the recessed portions 33 between the recording elements 31 may be filled with the non-magnetic material 32 by a deposition technique such as a CVD (chemical vapor deposition) method or an IBD (ion beam deposition) method by which bias power is applied to member to be processed.

Also in this case, the deposition conditions are adjusted so as to satisfy the foregoing Eq I. Thus, it is possible to deposit the non-magnetic material 32 to provide a surface shape of which the concavo-convex shape is restrained by a minute amount in the non-magnetic material filling process, up to a level that the surface roughnesses Ra of the recording layer and the non-magnetic material after the flattening process can be restricted to 1.7 or less.

In this exemplary embodiment, the non-magnetic material 32 is removed up to the top faces of the recording elements 31 by the ion beam etching using an argon gas to flatten the surfaces of the recording elements 31 and the non-magnetic material 32. The non-magnetic material 32 may be removed up to the top faces of the recording elements 31 by ion beam etching using another noble gas such as Kr (krypton), Xe (xenon), and the like, to flatten the surfaces of the recording elements 31 and the non-magnetic material 32. The surfaces of the recording elements 31 and the non-magnetic material 32 may be flattened by reactive ion beam etching using a halogen-containing gas such as $SF_6$, $CF_4$ (carbon tetrafluoride), $C_2F_6$ (hexafluoroethane), and the like. Otherwise, the surfaces of the recording elements 31 and the non-magnetic material 32 may be flattened by use of an etch back method by which a resist and the like are applied to make the resist surface flat after the deposition of the non-magnetic material, and then the surplus non-magnetic material is removed up to the recording elements by the ion beam etching method. Further more, the surfaces of the recording elements 31 and the non-magnetic material 32 may be flattened by use of a CMP (chemical mechanical polishing) method In this exemplary embodiment, the first mask layer 22, the second mask layer 24, and the resist layer 26 are formed on the continuous recording layer 20, and then the continuous recording layer 20 is divided by the three steps of dry etching. Materials for the resist layer and the mask layers, the number and thickness of layers, a type of dry etching, and the like are not specifically limited, as long as the continuous recording layer 20 is highly precisely divided.

In this exemplary embodiment, the material for the continuous recording layer 20 (the recording element 31) is a CoCr alloy. The exemplary embodiment of this invention is applicable to the processing of a magnetic recording medium which is composed of recording elements made of another material such as another alloy containing iron group elements (Co, Fe (iron), Ni), a layered product of these alloys and the like.

In this exemplary embodiment, the underlayer 14, the soft magnetic layer 16, and the seed layer 18 are formed under the continuous recording layer 20. The configuration of the layers under the continuous recording layer 20 may be appropriately changed in accordance with the type of magnetic recording medium. For example, one or two layers of the underlayer 14, the soft magnetic layer 16, and the seed layer 18 may be omitted. Otherwise, the continuous recording layer 20 may be formed directly on the substrate.

A data area is processed in this exemplary embodiment. As a matter of course, the surface roughness of the recording elements and non-magnetic material in a servo area can be restrained by setting the sputtering conditions in the non-magnetic material filling process in such a manner as to satisfy the foregoing Eq I.

In this exemplary embodiment, the magnetic recording medium 30 is a magnetic recording disc of the discrete track type on the perpendicular recording system, in which the recording elements 31 are arranged at minute intervals in the radial direction of the track. The exemplary embodiment of this invention, as a matter of course, is applicable to the manufacture of a magnetic disc in which recording elements are arranged at minute intervals in a peripheral direction (in the direction of a sector) of a track, a magnetic disc in which recording elements are arranged at minute intervals in both of the radial and peripheral directions of a track, a PERM (Pre-Embossed Recording Medium) type magnetic disc having a continuous recording layer in which concavo-convex pattern are formed, and a magnetic disc with a spiral-shaped track. The present invention is applicable to the manufacture of a magneto-optic disc such as a MO and the like, a magnetic disc with thermal assist which concurrently uses magnetism and heat, and another discrete track type of magnetic recording medium in a shape except for a disc such as a magnetic tape and the like.

EXAMPLE

In a manner of the foregoing exemplary embodiment described above, a plurality of types of magnetic recording mediums 30 were manufactured while the sputtering conditions in the non-magnetic material filling process (S120) were adjusted in such a manner that the deposition rate V (Å/min), the deposition rate $V_0$ (Å/min)($V_0$ is in a case where the bias power is zero), the width L (nm) of the recording element 31, the depth d (nm) of the recessed portion 33 between the recording elements 31, and the film thickness t (nm) of the deposited $SiO_2$ satisfy the foregoing Eq I. Each of the plurality of magnetic recording mediums varied in the width L (nm) of the recording element 31 and in the depth d (nm) of the recessed portion 33 between the recording elements 31. As to part of the types of magnetic recording mediums 30 with the same width L (nm) of the recording element 31 and the same depth d (nm) of recessed portion 33 between the recording elements 31, a plurality of magnetic recording mediums 30 were manufactured by varying in bias power in the non-magnetic material filling process (S120) and in the film thickness t (nm) of the $SiO_2$ (non-magnetic material 32). In the flattening process (S122), the incident angle of the Ar ions was set at approximately two degrees with respect to the surface.

Table 1 shows the width L (nm) of the recording element 31, the depth d (nm) of the recessed portion 33 between the recording elements 31, the bias power in the non-magnetic material filling process (S120), the film thickness t(nm) of the deposited $SiO_2$, the deposition rate V (Å/min) and the deposition rate $V_0$ (Å/min) ($V_0$ is in a case that the bias power is zero), according to each of the magnetic recording mediums 30 manufactured in this example. The magnetic recording mediums 30 manufactured in this example are plotted on a graph of FIG. 15 with triangular symbols, in which a vertical axis indicates the ratio $V/V_0$, and a horizontal axis indicates the right side of the foregoing Eq I, that is, $-0.003\times(L\cdot d/t)+1.2$.

Figure 16:
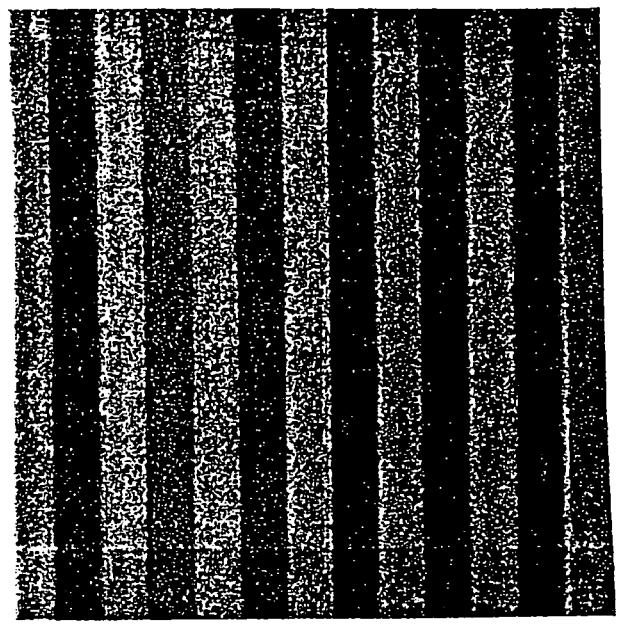
FIG. 16 is an optical photomicrograph showing the surface of the recording elements and the non-magnetic material of the magnetic recording medium according to the example of this invention after the non-magnetic material filling process.

Visually observing the surfaces of the deposited $SiO_2$ of these magnetic recording mediums 30 after the non-magnetic material filling process (S120) by use of an optical microscope, as shown in FIG. 16, there was no exfoliation of $SiO_2$ in any magnetic recording medium 30 and the favorable surfaces were formed. The surfaces of the recording elements and the $SiO_2$ of the magnetic recording mediums 30 after the flattneing process (S122) were observed by an atomic force microscope to measure surface roughness Ra. In any of the magnetic recording mediums 30, the surface roughness Ra was 1.7 (nm) or less.

Figure 17:
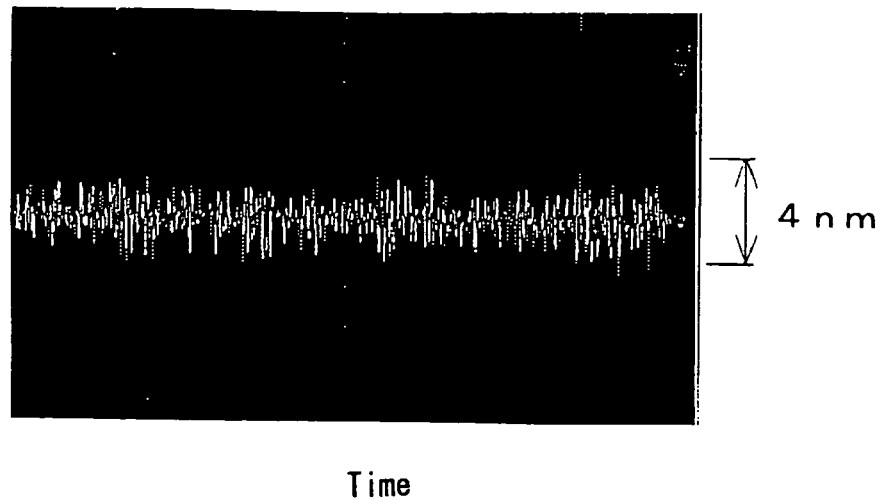
FIG. 17 is data showing variation in flying height of a head for the magnetic recording medium.

In one of these magnetic recording mediums 30, surplus processing by ion beam etching was carried out in the flattening process (S122) to make the surface roughness Ra approximately 1.7 (nm), and then the protective layer 34 and the lubricating layer 36 were formed thereon. Then, the magnetic recording medium 30 was mounted on a read/write tester to conduct a flying test. Variation in the flying height was measured by use of a laser beam. FIG. 17 shows test results.

Comparative Example 1

As opposed to the above example of the exemplary embodiment, a plurality of magnetic recording mediums 30 were manufactured by adjusting the sputtering conditions in the non-magnetic material filling process (S120) so that the ratio $V/V_0$ became larger than the right side of the foregoing Eq I, that is, the value of $-0.003\times(L\cdot d/t)+1.2$ to deposit the non-magnetic material.

The other conditions were the same as those of the foregoing example.

Table 1 shows the width L (nm) of the recording element 31, the depth d (nm) of the recessed portion 33 between the recording elements 31, the bias power in the non-magnetic material filling process (S120), the film thickness t (nm) of the deposited $SiO_2$, the deposition rate V (Å/min) and the deposition rate $V_0$ (Å/min) ($V_0$ is in a case that the bias power is zero), according to each of the magnetic recording mediums 30 manufactured in this comparative example 1. The magnetic recording mediums 30 manufactured in this comparative example 1 are plotted on the graph of FIG. 15 with rhombic symbols.

Visually observing the surfaces of the deposited $SiO_2$ Of these magnetic recording mediums 30 after the non-magnetic material filling process (S120) by use of the optical microscope, there was no exfoliation of the $SiO_2$ in any of the magnetic recording mediums 30. The surfaces of the recording elements and the $SiO_2$ of the magnetic recording mediums 30 after the flattening process (S122) were observed by the atomic force microscope to measure the surface roughness Ra. In any of the magnetic recording mediums 30, the surface roughness Ra exceeded 1.7 (nm).

Comparative Example 2

As opposed to the above example of the exemplary embodiment, a plurality of magnetic recording mediums 30 were manufactured by adjusting the sputtering conditions in the non-magnetic material filling process so that the ratio $V/V_0$ became smaller than the left side of the foregoing Eq I, that is, 0.1 to deposit $SiO_2$. The other conditions were the same as those of the foregoing example.

Table 1 shows the width L (nm) of the recording element 31, the depth d (nm) of the recessed portion 33 between the recording elements 31, the bias power in the non-magnetic material filling process (S120), the film thickness t (nm) of the deposited SiO$_2$, the deposition rate V (Å/min) and the deposition rate V$_0$ (Å/min) (V$_0$ is in a case that the bias power is zero), according to each of the magnetic recording mediums 30 manufactured in this comparative example 2. The magnetic recording mediums 30 manufactured in this comparative example 2 are plotted on the graph of FIG. 15 with square symbols.

Figure 18:
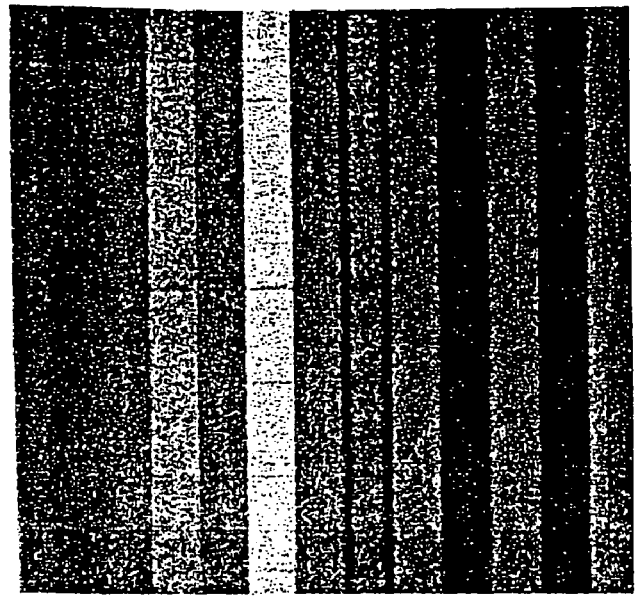
FIG. 18 is an optical photomicrograph showing the surface of recording elements and non-magnetic material of a magnetic recording medium according to the comparative example 2 after the non-magnetic material filling process.

Visually observing the surfaces of the deposited SiO$_2$ of these magnetic recording mediums 30 after the non-magnetic material filling process by use of the optical microscope, there was the exfoliation of the SiO$_2$ surface as shown in FIG. 18. The surface roughness Ra of the recording elements and the SiO$_2$ of these magnetic recording mediums 30 after the flattening process could not be measured because the SiO$_2$ was exfoliated.

Comparative Example 3

Figure 19:
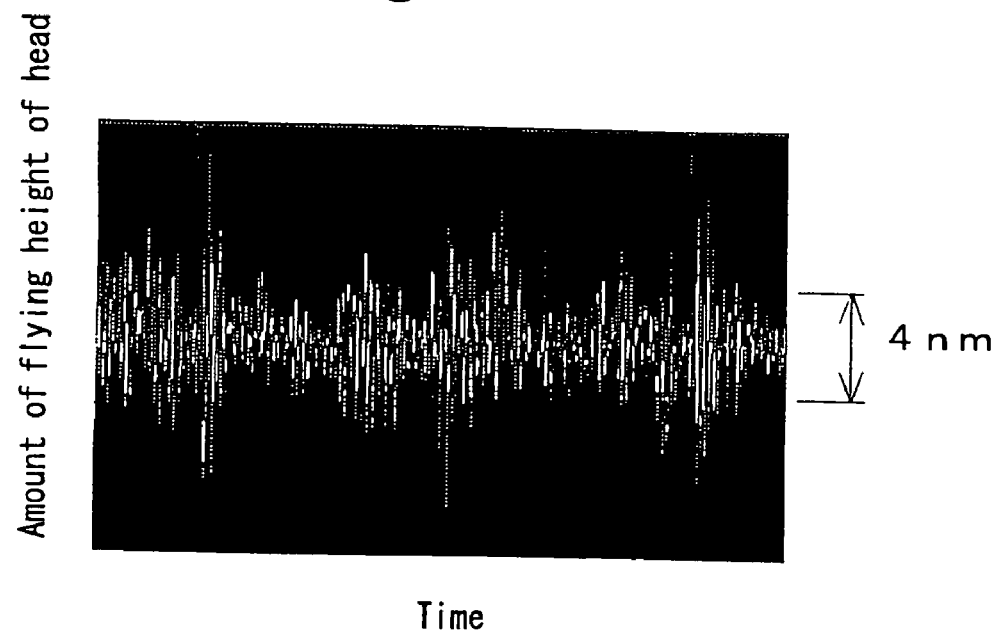
FIG. 19 is data showing variation in flying height of a head of a magnetic recording medium according to the comparative example 3.

In one of the magnetic recording mediums 30 according to the above example of the exemplary embodiment, surplus processing by ion beam etching was carried out in the flattening process (S122) to make the surface roughness Ra approximately 2.5 (nm). Then the protective layer 34 and the lubricating layer 36 were formed. Then, the magnetic recording medium 30 was mounted on the read/write tester to conduct a flying test. Variation in the flying height was measured by use of a laser beam. FIG. 19 shows test results.

Comparative Example 4

Figure 20:
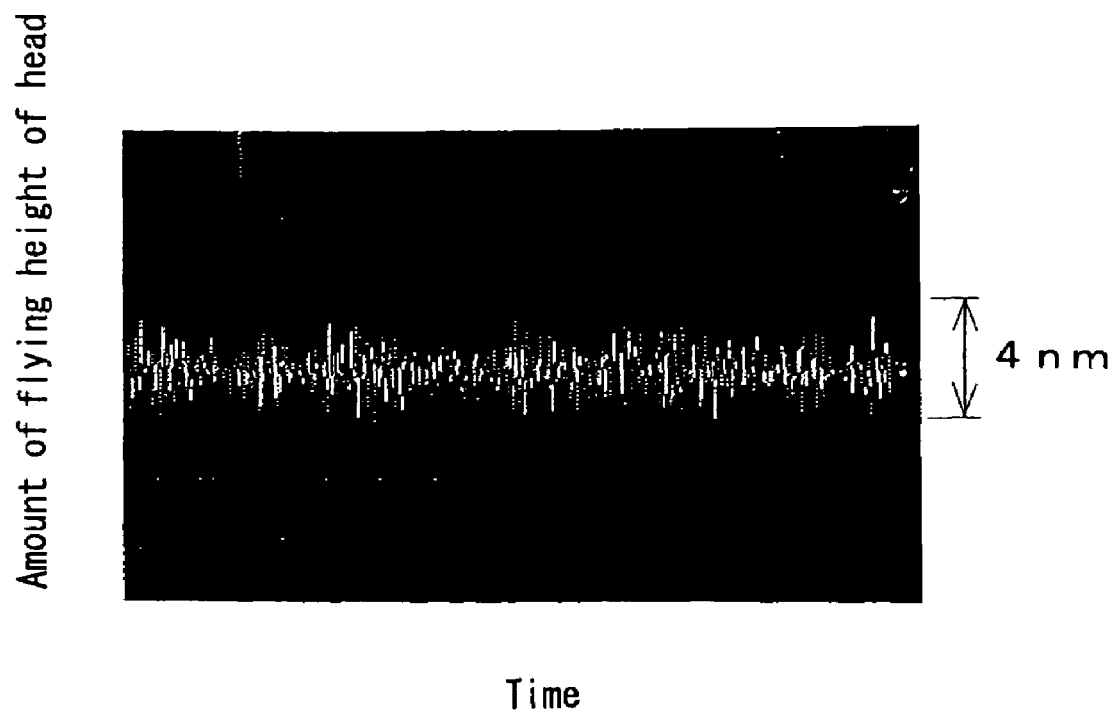
FIG. 20 is data showing variation in flying height of a head of a magnetic recording medium according to the comparative example 4.

A magnetic recording medium having the same configuration as that available on the market except for the continuous recording layer was manufactured, the configuration except for the continuous recording layer being common to the magnetic recording medium 30 described above. This recording medium had an undivided type continuous recording layer, the surface roughness of which was approximately 0.8 (nm). The magnetic recording medium was mounted on the read/write tester to conduct a flying test. Variation in the flying height was measured by use of a laser beam. FIG. 20 shows test results.

TABLE 1

|  | Bias power (W) | V (Å/min) | V$_0$ (Å/min) | L (nm) | d (nm) | t (nm) |
|---|---|---|---|---|---|---|
| Example | 0 | 84.19 | 84.19 | 90 | 30 | 80 |
|  | 0 | 84.19 | 84.19 | 90 | 35 | 80 |
|  | 150 | 65.49 | 84.19 | 90 | 30 | 25 |
|  | 150 | 65.49 | 84.19 | 100 | 34 | 25 |
|  | 150 | 65.49 | 84.19 | 100 | 34 | 45 |
|  | 150 | 65.49 | 84.19 | 125 | 32 | 45 |
|  | 150 | 65.49 | 84.19 | 150 | 30 | 45 |
|  | 150 | 65.49 | 84.19 | 90 | 30 | 75 |
|  | 150 | 65.49 | 84.19 | 100 | 34 | 75 |
|  | 150 | 65.49 | 84.19 | 110 | 35 | 75 |
|  | 150 | 65.49 | 84.19 | 125 | 32 | 75 |
|  | 150 | 65.49 | 84.19 | 150 | 30 | 75 |
|  | 150 | 65.49 | 84.19 | 150 | 45 | 75 |
|  | 150 | 65.49 | 84.19 | 230 | 45 | 75 |
|  | 250 | 14.76 | 45.08 | 90 | 30 | 45 |
|  | 250 | 14.76 | 45.08 | 110 | 35 | 45 |
|  | 250 | 14.76 | 45.08 | 90 | 30 | 85 |
|  | 250 | 14.76 | 45.08 | 110 | 35 | 85 |
|  | 250 | 14.76 | 45.08 | 150 | 45 | 85 |
|  | 250 | 14.76 | 45.08 | 230 | 45 | 85 |
|  | 290 | 6.28 | 45.08 | 90 | 30 | 55 |
|  | 290 | 6.28 | 45.08 | 110 | 35 | 55 |
|  | 290 | 6.28 | 45.08 | 150 | 45 | 55 |
|  | 290 | 6.28 | 45.08 | 230 | 45 | 55 |
| Comparative example 1 | 0 | 84.19 | 84.19 | 150 | 45 | 80 |
|  | 0 | 84.19 | 84.19 | 230 | 45 | 80 |
|  | 150 | 65.49 | 84.19 | 110 | 35 | 25 |
|  | 150 | 65.49 | 84.19 | 125 | 32 | 25 |
|  | 150 | 65.49 | 84.19 | 150 | 30 | 25 |
|  | 150 | 65.49 | 84.19 | 150 | 45 | 25 |
|  | 150 | 65.49 | 84.19 | 230 | 45 | 25 |
| Comparative example 2 | 300 | 3.93 | 45.08 | 90 | 30 | 55 |
|  | 300 | 3.93 | 45.08 | 110 | 35 | 55 |
|  | 300 | 3.93 | 45.08 | 150 | 45 | 55 |
|  | 300 | 3.93 | 45.08 | 230 | 45 | 55 |

Figure 15:
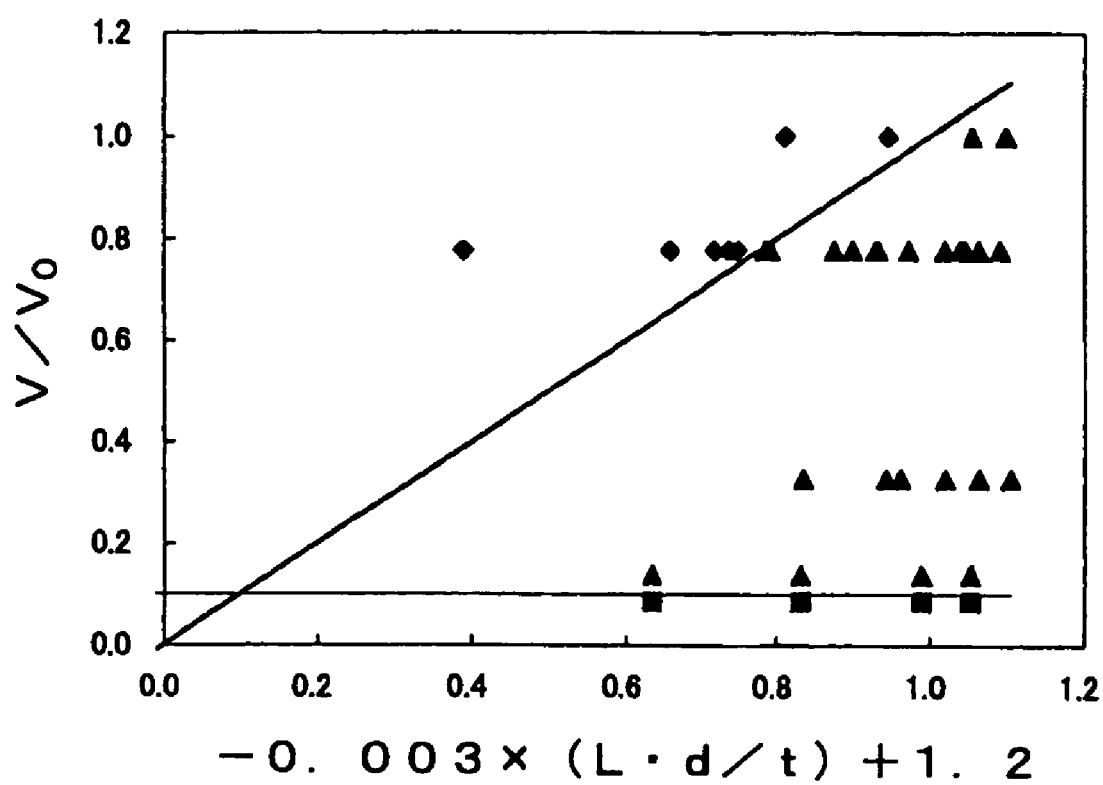
FIG. 15 is a graph showing the relation between each of magnetic recording mediums according to the example, the comparative example 1, and the comparative example 2 of this invention and an Eq I.

It is apparent from FIG. 15 that the magnetic recording mediums (according to the example in which the surface roughness Ra after the flattening process is restrained to 1.7 (nm) or less and the exfoliation of the non-magnetic material does not occur), the magnetic recording mediums (according to the comparative example 1 in which the surface roughness Ra after the flattening process exceeds 1.7 (nm)), and the magnetic recording mediums (according to the comparative example 2 in which the exfoliation of the non-magnetic material occurs) tend to distribute within one of the areas divided with borders of the right side of the foregoing Eq I, that is, $-0.003 \times (L \cdot d/t) + 1.2$, V/V$_0$, and the left side of the foregoing Eq I, that is, 0.1. In other words, it is possible to restrain the surface roughness Ra after the flattening process to 1.7 (nm) or less by means of adjusting the sputtering conditions in the non-magnetic material filling process in such a manner as to satisfy the foregoing Eq I.

It has been verified by experiment and the like that a conventional magnetic recording medium with a continuous recording layer has fine recording/reading characteristics, when variation in flying height of a head is equal to or less than 4 nm (±2 nm). In the case of the comparative example 3 in which the surface roughness Ra after the flattening process is 2.5 (nm) (larger than 1.7) as shown in FIG. 19, the variation in the flying height of the head is approximately 6 nm (±3 nm), and significantly exceeds 4 nm (±2 nm). Suppose that the surface roughness Ra after the flattening process is approximately 1.7 (nm) like the example of the exemplary embodiment shown in FIG. 17 and the magnetic recording medium is of the discrete track type the recording layer of which is divided into many recording elements. Even in this case, on the other hand, it has been verified that the variation in flying height of the head is restrained to 4 nm or less (±2 nm), as in the case of the conventional magnetic recording medium of the comparative example 4 having the continuous recording layer, the surface roughness Ra of which is approximately 0.8 (nm). Namely, even in the magnetic recording medium, the recording layer of which is formed into the concavo-convex pattern, it is possible to make the flying height of the head stable by means of depositing the non-magnetic material in such a manner as to satisfy the foregoing Eq I, and flattening the non-magnetic material after filling the recessed portion of the concavo-convex pattern of the recording layer with the non-magnetic material. Therefore, it is possible to obtain fine recording/reading characteristics.

Various exemplary embodiments of this invention is applicable to the manufacture of a magnetic recording medium having a recording layer formed into concavo-convex pattern such as a discrete track type hard disc.

What is claimed is:

1. A method for manufacturing a magnetic recording medium having a recording layer formed into a predetermined concavo-convex pattern over a substrate in which recessed portions of the concavo-convex pattern are filled with a non-magnetic material, the method comprising:

a non-magnetic material filling step of depositing the non-magnetic material on a surface of a member to be processed to which bias power is applied, the member to be processed having the recording layer formed into the predetermined concavo-convex pattern over the substrate, to fill the recessed portions with the non-magnetic material, while adjusting a deposition rate V, being a film thickness of the non-magnetic material deposited per unit of time, by adjusting deposition conditions including the bias power, wherein the non-magnetic material filling step is carried out by adjusting the deposition conditions in such a manner as to satisfy the following relationship $$0.1 \leq V/V_0 \leq -0.003 \times (L \cdot d/t) + 1.2$$

where $V_0$ represents the deposition rate in a case that the bias power is 0, t represents a film thickness of the non-magnetic material, L represents a width of a projected portion of the concavo-convex pattern, and d represents a depth of the recessed portion of the concavo-convex pattern.

2. The method for manufacturing a magnetic recording medium according to claim 1, further comprising a flattening step of flattening surfaces of the recording layer and the non-magnetic material by removing any surplus non-magnetic material after the non-magnetic material filling step.

* * * * *